United States Patent [19]
Beck et al.

[11] Patent Number: 5,609,182
[45] Date of Patent: Mar. 11, 1997

[54] VALVE

[75] Inventors: Erhard Beck, Weilburg; Albrecht Otto, Hanau, both of Germany

[73] Assignee: ITT Automotive Europe GmbH, Germany

[21] Appl. No.: 436,448

[22] PCT Filed: Nov. 13, 1993

[86] PCT No.: PCT/EP93/03186

§ 371 Date: May 23, 1995

§ 102(e) Date: May 23, 1995

[87] PCT Pub. No.: WO94/12789

PCT Pub. Date: Jun. 9, 1994

[30] Foreign Application Priority Data

Dec. 24, 1992 [DE] Germany .................. 42 39 362.0

[51] Int. Cl.[6] .................. E03B 3/18; F16K 15/00
[52] U.S. Cl. .................. 137/539; 137/550
[58] Field of Search .................. 137/539, 550; 251/366, 367

[56] References Cited

U.S. PATENT DOCUMENTS

| | | |
|---|---|---|
| 2,056,160 | 10/1936 | Allen . |
| 2,612,237 | 9/1952 | Tear .................. 137/539 X |
| 3,542,155 | 11/1970 | Kern .................. 137/539 |
| 3,712,326 | 1/1973 | Thacker .................. 137/539 X |
| 3,894,556 | 7/1975 | Pareja .................. 137/539 |
| 4,190,941 | 3/1980 | Charron . |
| 4,284,391 | 8/1981 | Williamson . |
| 4,287,912 | 9/1981 | Henett .................. 137/539 X |
| 4,365,648 | 12/1982 | Grothe .................. 137/539 |
| 5,054,195 | 10/1991 | Keck et al. .................. 29/888.453 |
| 5,404,904 | 4/1995 | Glaser .................. 137/539 |

FOREIGN PATENT DOCUMENTS 0197320  10/1986  European Pat. Off. .
4027794  3/1992  Germany .

OTHER PUBLICATIONS

Abstract of Japanese Publication No. JP60164080 dated 27 Aug. 1985.

International Search Report for Application No.PCT/EP93/03186 filed 13 Nov. 1993.

German Search Report for Application P4239362.0 filed 24 Nov. 1992.

Primary Examiner—Hoang Nguyen
Attorney, Agent, or Firm—Thomas N. Twomey; J. Gordon Lewis

[57] ABSTRACT

A valve for high-pressure radial piston pumps suitable for controlled brake systems. Prior art pumps consist of at least 5 elements. The valve includes less components and thus is less expensive to manufacture and easier to assemble. The valve's simplicity derives from the use of cold extruded connections between the valve and the housing, so that separate rubber sealings are superfluous, and which provide for a strong and non-detachable connection. Favorable embodiments of the present invention integrate some of the known valve elements thus reducing the number of the necessary cold extruded connections.

12 Claims, 2 Drawing Sheets

VALVE

TECHNICAL FIELD

The present invention relates to valves and more particularly relates to valves for radial piston pumps.

BACKGROUND OF THE INVENTION

The German patent application DE-OS 40 27 794 discloses a radial piston pump. This radial piston pump is equipped with a suction valve as well as with a pressure valve. The pressure chamber of the pressure valve is sealed by means of a cover screwed into a housing, the cover being equipped with a sealing ring. The known pressure valve further comprises a spherical valve member, a spring biassing the spherical valve member and a valve seat. Consequently, five components are needed for the functioning of the pressure valve.

The present invention is based on a much simpler design.

The object of the present invention is to simplify such a valve by reducing the number of necessary components and therefore to reduce the costs of the valve.

SUMMARY OF THE INVENTION

The present invention is based in principle on the fact, that a new connection type at the same time achieves a retaining and a sealing function so that special sealing elements are no longer necessary. Prerequisite for the effectiveness of these provisions is an insertion pressure that is high enough to make a sufficient amount of material of the shoulder run into the groove of the valve seat. The circumferential groove extends at a certain angle relative to the two circumferential surfaces of the shoulder so that the housing material running into the groove provides for an undercut relative to the outer contour. This leads on the one hand to a retaining function and on the other hand to a sealing function, since the housing material—being under pressure—fills the groove completely thus connecting the two components in a sealing and non-detachable manner.

The provisions according to the present invention can be applied in a positive way also with regard to the cover. Thus the valve seat does not only support the valve, but provides also an annular accommodation for a cover which can be pressed into the valve seat, and which can be connected with the valve seat in a sealing manner by means of cold extrusion according to the method described above. A subsequent insertion of the cover is necessary because the valve member is biassed by means of a valve spring and both elements have first to be inserted with the cover opened, before the cover can be closed.

Another type of construction with a reduced number of elements, is given in which the annular projection is omitted and the cover is not inserted this annular projection but connected, in a further step, directly with the housing by means of cold extrusion, after having mounted the valve member and the valve spring.

A further reduction of the number of components is accomplished by integrating the cover and valve seat. The problem is, however, that the valve member including spring must still be retained in this unit. This problem is solved by first equipping the unit consisting of valve seat and cover with the valve member and the biassing spring and then anchoring the equipped unit in the housing by means of cold extrusion.

The volume of the unit consisting of valve seat and cover is such that the pressure fluid generated by the pump is conducted to the outlet in the housing passing a restrictor. Therefore the pressure fluid present at the outlet of the housing shows comparatively small pressure variations since the restrictor dampens the high-pressure pulses of the pressure fluid. In this regard it must be assured, however, that the pressure fluid pumped into the valve chamber by means of the pressure valve cannot flow directly to the outlet of the housing, i.e. without passing the connection equipped with the restrictor. Thus the valve chamber is closed in a convenient manner by means of a sealed plug. It is a matter of course that, due to this additional characteristic, the number of elements necessary for the valve is higher. However, the plug, in its turn, can be pressed in a sealing manner into the unit consisting of valve seat and cover by means of cold extrusion, the material for the plug usually being softer than the unit consisting of valve seat and cover.

A particularly simple connection between valve chamber and damping chamber results in a particularly simple construction of the restrictor within the connection.

A preferred construction type of the cavity is disclosed as well as the installation of a an additional filter in order to clean the brake fluid delivered under pressure.

DETAILED DESCRIPTION OF THE PREFERRED EMBODIMENTS

Figure 1:
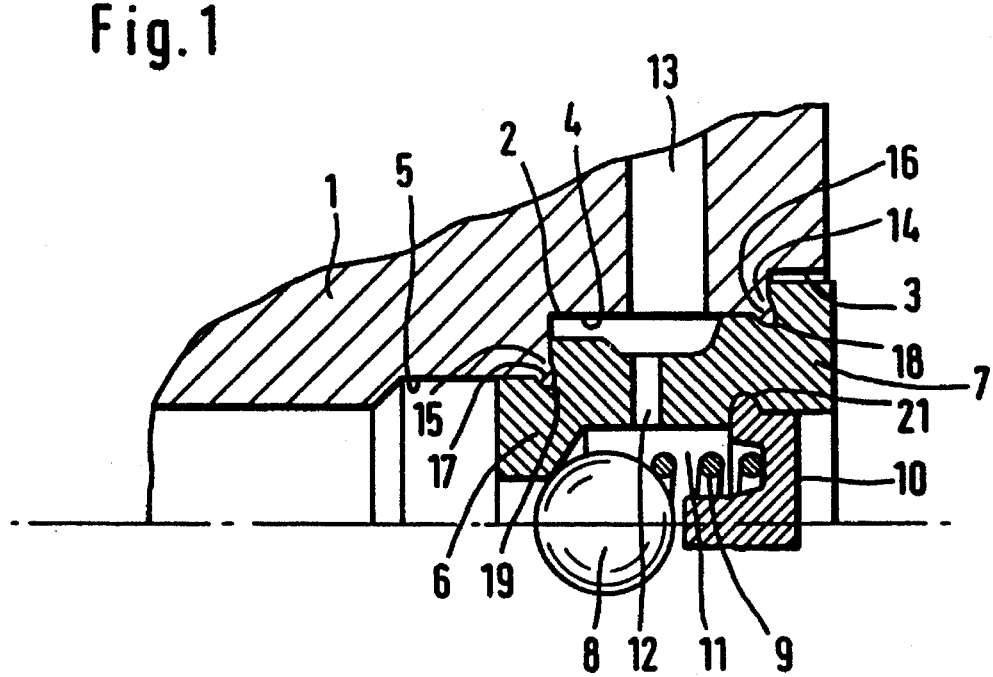
FIG. 1 is an embodiment of the valve with 4 components.

FIG. 1 shows a section of a housing 1 which can be the housing of a high-pressure radial piston pump, as shown e.g. in DE-OS 40 27 794.

The housing is provided with a stepped bore presenting a first section 3, a second section 4 and a third section 5. Further bore sections can follow, which e.g. accommodate the piston of the radial piston pump. The stepped bore 2 accommodates a valve seat 6 which is of integral design with annular valve projection 7. A valve member 8 is pressed against the valve seat 6 by means of a spring 9 bearing against a cover 10 at the opposite end. The interior of the valve member 6 and the cover 10 delimit a valve chamber 11 which is connected with a housing outlet 13 by a passage 12 and the interior of the second bore section 2. The pressure fluid delivered by the pump and being under pressure can be drawn from housing outlet 13.

It is of particular importance for the present invention that the materials used for the housing and the unit consisting of valve seat and annular projection, have a different hardness, i.e. the material of the former is softer than that of the latter or vice versa. In the present example of the invention it is assumed that the housing is made of soft aluminum while valve seat 6 and annular projection 7 are made of tensile steel. Furthermore it is very important, that the passage from the first bore section 3 to the second bore section 4, and from the second bore section 4 to the third bore section 5 is formed like a shoulder which results in a first circumferential shoulder 14 and a second circumferential shoulder 15.

Opposite to the respective shoulder edges 16 and 17 there is a circumferential groove 18 and 19. The valve seat 6 as well as the annular projection 7 each include two sections with different diameters, the large-diameter section bearing against the bottom of one bore section, e.g. relative to the valve seat 6 of the second bore section 4, while the small section extends into the following smaller bore section (e.g. third bore section 5). The two sections of the valve seat 6 are—as already mentioned—separated by the groove 19. The same applies for the annular projection 7 bearing against the first bore section 3 with its large section and extending in the second bore section 4 with its small section.

By pressing (e.g. the valve seat 6 against shoulder 15 of housing 1) the material of the shoulder it is caused to penetrate groove 19. The same applies for the annular projection 7, the groove 18 of which during pressing is filled with material of shoulder 14. Both procedures happen at the same time because of the integral design of valve seat 6 and the annular projection 7. On the one hand, the material of the housing 1 inserted under pressure into the grooves 18, 19 forms an undercut preventing the unit 6,7 from being pulled out of the stepped bore 2 and, on the other hand, being able to seal the considerable pressure in the third bore section 5 and the second bore section 4 with regard to the following larger bore section. This way the O-ring seals and the relative grooves can be omitted which otherwise are necessary, reducing at the same time the mounting time. The described characteristics simplify also the automatic mounting since the components, among other things, do not have to be equipped with sealing rings.

After the valve seat 6 has been pressed in the described, sealing manner into the housing 1 and has been equipped with valve member 8 and spring 9, a cover 10 can be inserted by means of the cold extrusion procedure described above. The cover 10 is preferably made of softer material than the valve seat 6 and annular projection 7. For this reason, in the annular projection 7 another groove 21 is provided which is arranged at one shoulder in the annular projection 7. Pressing the cover 10 onto the shoulder, part of the material of the cover runs into the groove 21. The undercut of the cover material relative to the annular projection 7 achieved in this manner connects the cover in a non-detachable and sealing way with the annular projection 7 and thus closes the valve chamber 7 against the environment in a pressure-tight manner.

In the following embodiments of the present invention the components that are comparable with the components in FIG. 1 are given the same reference numbers. For the embodiments according to FIGS. 2 to 4 only the differences with regard to FIG. 1 are described.

Figure 2:
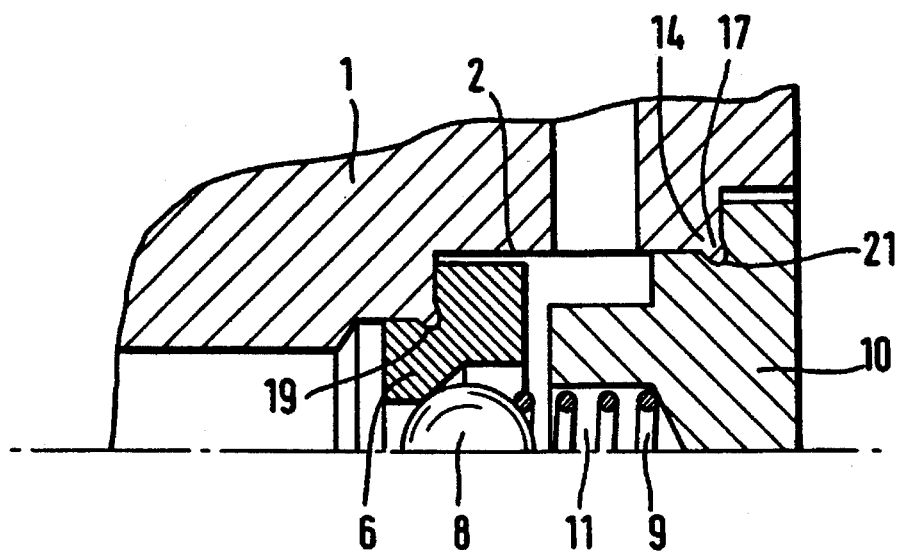
FIG. 2 is a modified embodiment of the valve also with 4 components.

In the embodiment according to FIG. 2 the valve seat 6 is inserted in the same manner into the stepped bore 2 of housing 1, as already described for FIG. 1. The groove 19 is once again inclined by about 45° relative to the longitudinal axis of the valve. The spherical valve member 8 bears once more against the cover 10. The fundamental difference with regard to FIG. 1 is, however, that cover 10 is connected in a direct, non-detachable and sealing manner with housing 1 by means of cold extrusion since the material of the first shoulder 14 is pressed into groove 21. Also in this case the edge 17 extends into groove 21. Since in this case the cover 10 interacts with the soft housing 1, the material of cover 10 must be harder than the material of the housing (aluminum) in order to achieve the desired flow movement in presence of the insertion pressure. As already explained above, in the embodiment according to FIG. 1, the material of the cover must be softer than that of valve seat 6 and thus that of the annular projection 7 so that the cover material can flow into the groove 21.

The fundamental advantage of the embodiment according to FIG. 1 with regard to that of FIG. 2 is that the destruction of cover 10 provides an access to the valve chamber 11 so that there is the possibility to do repair or adjustment work. This is not possible with the embodiment according to FIG. 2, since the shape of the housing 1 has been changed and it is only possible in a limited way to insert a new cover, which does not assure a safe and sealing connection anymore. On the other hand the embodiment according to FIG. 2 is inexpensive and simple to produce due to the reduced number of extruded connections (two grooves 19, 21 instead of three grooves 18, 19, 21 in FIG. 1). As long as it is not necessary to open cover 20 during the lifetime of the housing 1, the embodiment according to FIG. 2 is preferred.

A further modification results from the substitution of the effect of the passage according to FIG. 1 by the distance between the valve seat 6 and the cover 10. This, too, leads to a more simple construction.

Figure 3:
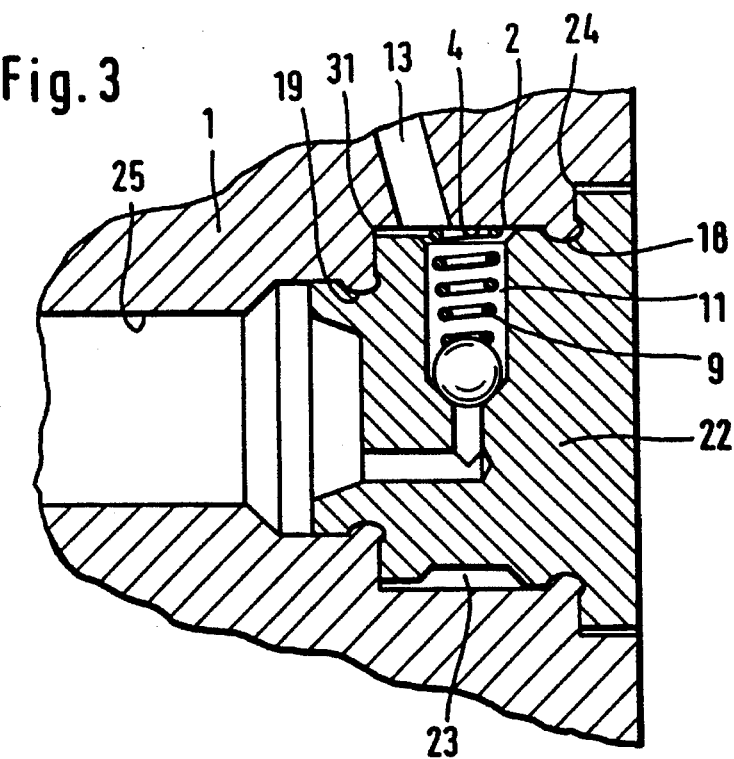
FIG. 3 is a third embodiment of the valve according to the present invention consisting of 3 components.

While in the embodiments according to FIGS. 1 and 2, four components are sufficient for the valve, i.e. valve seat 6, valve member 8, spring 9 and cover 10, the embodiment according to FIG. 3 allows omitting a further component. For this reason the valve seat 6 and the cover 10 according to FIG. 2 are, contrary to FIG. 2, designed integrally in order to form a cover element 22, in which the valve seat is inserted. The cover member is inserted in the housing 1 by means of cold extrusion, Just like the unit consisting of valve seat 6 and annular projection 7 according to FIG. 1. Instead of a separate cover, as in FIG. 1 against which the spring 9 abuts, in the embodiment according to FIG. 3 the cover is formed in one piece with the annular projection and the valve member. The surface of the second bore section 4 of the stepped bore 2 serves as an abutment for spring 9. This means that the position of the valve seat compared with the embodiments according to FIGS. 1 and 2, is rotated by 90° so that the valve chamber 11 now extends in radial direction.

According to the construction of the grooves 18, 19 in FIG. 3, the material of the cover member must be harder than that of housing 1. One could imagine, however, also the opposite constellation, i.e. the grooves are executed in appropriate shoulders, e.g. at the points 23, 24 of housing 1, and the softer material of the cover member 22 runs into the grooves of the housing.

In order to ensure that the mounting position of valve body 22 in the housing 1 is independent from the rotating angle, the valve member 22 is equipped with a circumferential groove 23 into which the valve chamber 11, formed as a radial bore, ends. The circumferential groove 23 is connected with the housing outlet 13. By means of appropriate channels the valve chamber 11 is connected with the interior of housing 1, e.g. a fourth section 25 of the stepped bore 2.

Figure 4:
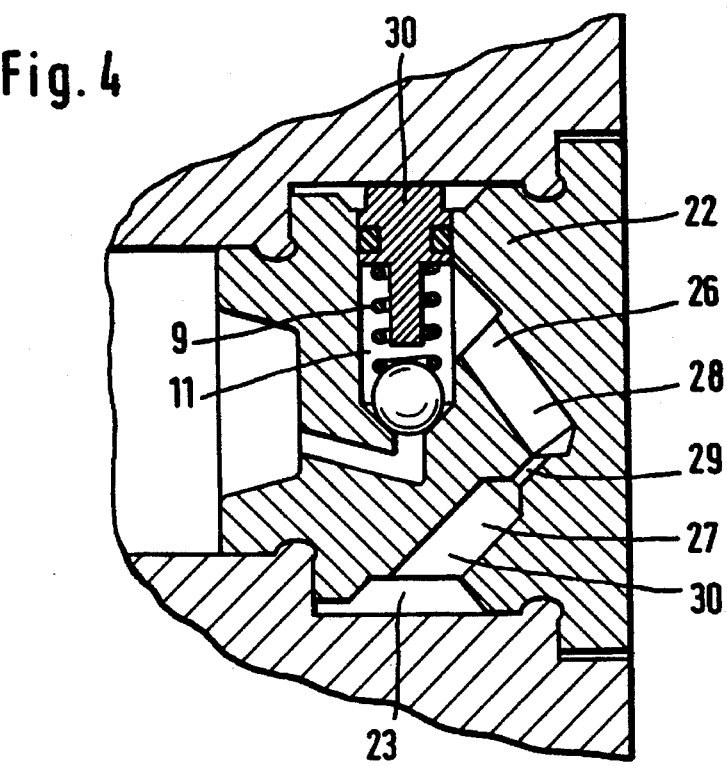
FIG. 4 is a modified embodiment of the valve according to FIG. 3.

FIG. 4 shows a modification of the design according to FIG. 3, where only the differences of the embodiment according to FIG. 4 relative to the embodiment of FIG. 3 are described. The fundamental difference is that in addition a second stepped bore 26 and a third stepped bore 27 which are arranged at an angle to each other and intersect. The second bore section 28 of the second stepped bore 27 provides space for the accommodation of a filter, while the second bore section 29 of the second stepped bore 27 serves as restrictor for the noise damping. This way the chamber formed by the second bore section 28 in connection with the valve chamber 11 is involved in the silencing in connection with the restrictor-type second bore section 29. The accumulating effect of the first bore section 30 of the third stepped bore 27 in connection with the chamber created by the circumferential groove 23 contributes thus to a noise reduction.

In order that the pressure fluid flows from the valve chamber 11 across the second and third stepped bore 26, 27 and the circumferential groove to the housing outlet which is not indicated in the drawing, a sealed plug 30 is foreseen which seals the valve chamber 11 in radial direction and on which the spring 9 abuts.

If the cover member 22 shall be exchangeable, the grooves must be executed in the housing 24 and the cover member 22 must be made of softer material than housing 1, as described in connection with the embodiment according to FIG. 3.

We claim:

1. A valve assembly, comprising:

a valve seat housing formed of a first metal and having a stepped bore therein, a valve seat disposed in the stepped bore of the valve seat housing and having a first diameter section and an adjacent larger second diameter section defining a stepped shoulder and having an undercut circumferential groove at the stepped shoulder in which is disposed a cold extrusion of the first metal from the valve seat housing thereby connecting the valve seat housing and the valve seat, a valve member disposed within the valve seat, a biasing spring disposed between the housing and the valve member urging said valve member against said seat, and a housing cover axially aligned with the valve seat and sealingly closing the stepped bore in the valve seat housing.

2. A valve as claimed in claim 1 wherein the valve seat presents an annular projection extending in the direction of the cover having an axially directed opening in which the cover is disposed and the valve seat further having a groove within the axially directed opening in which is disposed a radially extending cold extrusion portion of the cover wherein engagement between the radially extending cold extrusion portion of the cover and the valve seat groove retains the cover in a fixed position relative to the valve seat.

3. A valve as claimed in claim 2, wherein the annular projection is connected in a sealing manner with the housing by a second cold extrusion of the first metal into a second circumferential groove in the valve seat.

4. A valve as claimed in claim 1, wherein the cover is connected to the valve seat housing in a sealing manner by a cold extrusion of a portion of the valve seat housing into a groove in the cover.

5. A valve as claimed in claim 4, wherein the cover is formed integrally with the valve seat in order to form a single cover and valve seat member.

6. A valve, as claimed in claim 5, wherein the valve seat is arranged in a radial direction and the valve element is biassed in a radial direction.

7. A valve as claimed in claim 6, wherein the biassing spring abuts a wall of the stepped valve housing bore in a radial direction.

8. A valve as claimed in claim 7, wherein the unit consisting of the integral valve seat and cover is provided with a cavity serving as a damping chamber connected with the valve chamber accommodating the valve member by means of a restrictor.

9. A valve as claimed in claim 8, wherein the valve chamber is connected with the cavity by means of two bores arranged at a certain angle to each other.

10. A valve as claimed in claim 9, wherein at least one of the two bores is a stepped bore and a small bore section functions as the restrictor in this connection.

11. A valve as claimed in claim 8, wherein the cavity is formed by a circumferential groove in a cover member, closed by the wall of the housing bore accommodating the cover unit.

12. A valve as claimed in claim 8, further including a filter inserted in one of the bores forming the connection.

* * * * *